United States Patent
Bahl et al.

(10) Patent No.: US 7,321,520 B2
(45) Date of Patent: Jan. 22, 2008

(54) CONFIGURABLE LENGTH FIRST-IN FIRST-OUT MEMORY

(75) Inventors: Swapnil Bahl, New Delhi (IN); Balwant Singh, Greater Noida (IN)

(73) Assignee: STMicroelectronics Pvt. Ltd., Uttar Pradesh (IN)

( * ) Notice: Subject to any disclaimer, the term of this patent is extended or adjusted under 35 U.S.C. 154(b) by 0 days.

(21) Appl. No.: 11/394,874

(22) Filed: Mar. 31, 2006

(65) Prior Publication Data
US 2006/0256636 A1   Nov. 16, 2006

(30) Foreign Application Priority Data
Mar. 31, 2005   (IN) .......................... 708/DEL/2005

(51) Int. Cl.
*G11C 7/00* (2006.01)
(52) U.S. Cl. ...................... 365/221; 365/233; 365/236; 365/230.01
(58) Field of Classification Search ................ 365/221, 365/233, 236, 230.01
See application file for complete search history.

(56) References Cited

U.S. PATENT DOCUMENTS

| | | | | |
|---|---|---|---|---|
| 4,258,418 | A | 3/1981 | Heath | 364/200 |
| 5,845,039 | A * | 12/1998 | Ko et al. | 386/16 |
| 6,263,374 | B1 * | 7/2001 | Olnowich et al. | 709/253 |
| 6,463,111 | B1 * | 10/2002 | Upp | 375/372 |
| 6,651,201 | B1 | 11/2003 | Adams et al. | 714/733 |
| 6,838,902 | B1 * | 1/2005 | Elftmann et al. | 365/230.03 |
| 6,934,198 | B1 * | 8/2005 | Lowe et al. | 365/189.05 |
| 6,937,172 | B1 * | 8/2005 | Lowe et al. | 341/97 |

* cited by examiner

*Primary Examiner*—Thong Q. Le
(74) *Attorney, Agent, or Firm*—Lisa K. Jorgenson; Allen, Dyer, Doppelt, Milbrath & Gilchrist, P.A.

(57) ABSTRACT

A configurable length first-in first-out (FIFO) memory includes a memory core for storing data, a write address counter connected to the memory core for counting locations for writing the data to be stored, and a read address counter connected to the memory core for counting the locations for reading the stored data. The read address counter includes a comparator for generating a synchronous reset for itself. A selector is connected to the comparator for selecting a user defined FIFO length, or a pre-programmed write address counter length.

19 Claims, 4 Drawing Sheets

CONFIGURABLE LENGTH FIRST-IN FIRST-OUT MEMORY

FIELD OF THE INVENTION

The present invention relates to memory devices, and more particularly, to a configurable length first-in first-out (FIFO) memory.

BACKGROUND OF THE INVENTION

Memories are an integral part of a system on chip (SoC). Different types of memories are preferred based on the application and their intended use. First-in first-out (FIFO) memories are commonly used in memory-dominated architecture of SoC devices. Unlike other memories, FIFO memories have no address buses to retrieve data from a particular address. These memories have separate read and write address counters, which increment themselves on each read and write operation, respectively. These counters reset themselves to the first address on reaching the last address in the FIFO memory. FIFO memories occupy less space in comparison to conventional memories due to a lack of address generation devices and address buses. They are extensively used in devices where data retrieval is required in a fixed order.

FIFO memory chips are used in buffering applications between devices that operate at different speeds, or in applications where data must be stored temporarily for further processing. Typically, this type of buffering is used to increase bandwidth and to prevent data loss during high-speed communications. As the term FIFO implies, data is released from the buffer in the order of its arrival. Some FIFO memories read with one clock and write with another simultaneously. Synchronous operations require a clock, but asynchronous operations do not. Flow control generates full and empty signals so that inputs do not overwrite the contents of the buffer. Depending on the device, a FIFO memory can be unidirectional or bidirectional. A FIFO memory can also include parallel inputs and outputs as well as programmable flags.

A FIFO memory is commonly used for storage of code for programmable devices that execute a set of operations on multiple blocks/locations. For instance, a programmable built-in self test (BIST) executes a sequence of operations on all memory locations. By maintaining the code sequence of memory operations in a FIFO memory, the BIST reads the FIFO memory for the code and executes the operations. If the number of operations is equal to the length of the FIFO, then the BIST does not reset the FIFO memory after all the operations have been executed on one location as the FIFO memory resets its address counter to the first location. But if the FIFO length is not equal to the number of operations, the BIST keeps track of the number of operations executed and resets the FIFO address counter accordingly. This leads to a significant hardware overhead for control circuitry in the BIST, and also slows down the BIST speed.

Additionally, after the execution of the last operation on a location, the BIST needs the first operation to execute on the next location in the next clock cycle. This means that the FIFO counters are reset before the next clock cycle. A designer has to adapt his synchronous design on negative edges as well, which is generally undesirable and is not supported by many design tools.

The prior art architecture is illustrated in FIG. 1. Each data source (Block 1 and Block 3) and their associated data receiver (Block 2 and Block 4) has a dedicated FIFO memory (FIFO 1 and FIFO 2) regardless of the FIFO length and the operation mode. This leads to an existence of redundant FIFO memories, and consequently, to a waste of silicon area.

U.S. Pat. No. 6,651,201 discloses an example architecture with a fixed length FIFO memory. This patent describes a BIST wherein the BIST controller has a dedicated built-in micro-code storage device (i.e., a FIFO). The micro-code storage device is the largest contributor to area overhead due to the presence of the BIST on the chip. A variable length FIFO, which may be shared between several blocks, is highly desirable in such instances to reduce the silicon area.

It is desirable to have a particular length FIFO memory in BISTs and in many other blocks on a SoC. Dedicated FIFO memories of different lengths are used for different blocks on a chip resulting in extra silicon area overhead. One approach is to share the FIFO memories between blocks that require equal length FIFO memories. However, this sharing may not be possible where parallel execution is required for the FIFO memory sharing the blocks. In addition to area overhead, the presence of multiple FIFO memories significantly slows down the design process. Time taken in the design process from generating the FIFO code to layout of the chip is several weeks. If the FIFO memory has to be varied for a different code, the design process has to be repeated, resulting in an unnecessary slowdown of the design process.

There is a need for an improved FIFO memory that will reduce the number of FIFO memories required on a chip. Moreover, there is a need for a FIFO memory that may not require significant control circuitry to perform the FIFO counter resetting. Additionally, there is a need to address the negative edge clock problem mentioned above and to reduce the design cycle time.

SUMMARY OF THE INVENTION

In view of the foregoing background, an object of the invention is to provide a variable length FIFO memory which can be configured to a required length and can be shared between various blocks on a chip.

Another object of the invention is to reduce the control circuitry required for external pointer updates by having a FIFO memory with a configurable length.

Another object of the invention is to reduce the required silicon area on a chip by sharing FIFO memories among the various circuit blocks thereon.

Yet another object of the invention is to provide fast delivery of a chip design in case a change in the required length is made for FIFO memories on a chip.

These and other objects, advantages and features in accordance with the invention are provided by a configurable length first-in first-out memory comprising a memory core for storing the data, a write address counter connected to the memory core for counting the locations for writing the data, and a read address counter connected to the memory core for counting the locations for reading the data. The read address counter may include a comparator for generating a synchronous reset for the read address counter, and selection means or a selector is connected to the comparator for selecting a user defined FIFO length or a pre-programmed write address counter length.

The memory core may comprise memory cells or flip-flops. The comparator may generate an active high signal as soon as a read address counter equals the user defined FIFO length or a pre-programmed write address counter length.

The read address counter may synchronously reset to the initial address location on generation of an active high signal by the comparator. The selector may be a multiplexer.

Another aspect of the invention is directed to a method for configuring the length of a first-in first-out memory comprising the steps of providing a memory core, counting the locations for writing the data, counting the locations for reading the data, and selecting between a user defined FIFO length or a pre-programmed write address counter length. The method may further comprise comparing the read address counter value to the user defined FIFO length or the pre-programmed write address counter length, and generating a synchronous reset signal on reaching the user defined FIFO length or the pre-programmed write address counter length. The read address counter may be reset to an initial address on receiving the synchronous reset signal.

The present invention addresses the problems of extra control circuitry for pointer updates, negative edge clocking and the design process slowdown by introducing variable length FIFO memories on a chip. By sharing the FIFO memories among blocks on a chip, a reduction is made in the number of FIFO memories required on a chip for increasing required parallel operations on a chip. This subsequently reduces the silicon area for a design.

BRIEF DESCRIPTION OF THE DRAWINGS

The invention will now be described with reference to the accompanying drawings.

DETAILED DESCRIPTION OF THE PREFERRED EMBODIMENTS

Figure 1:
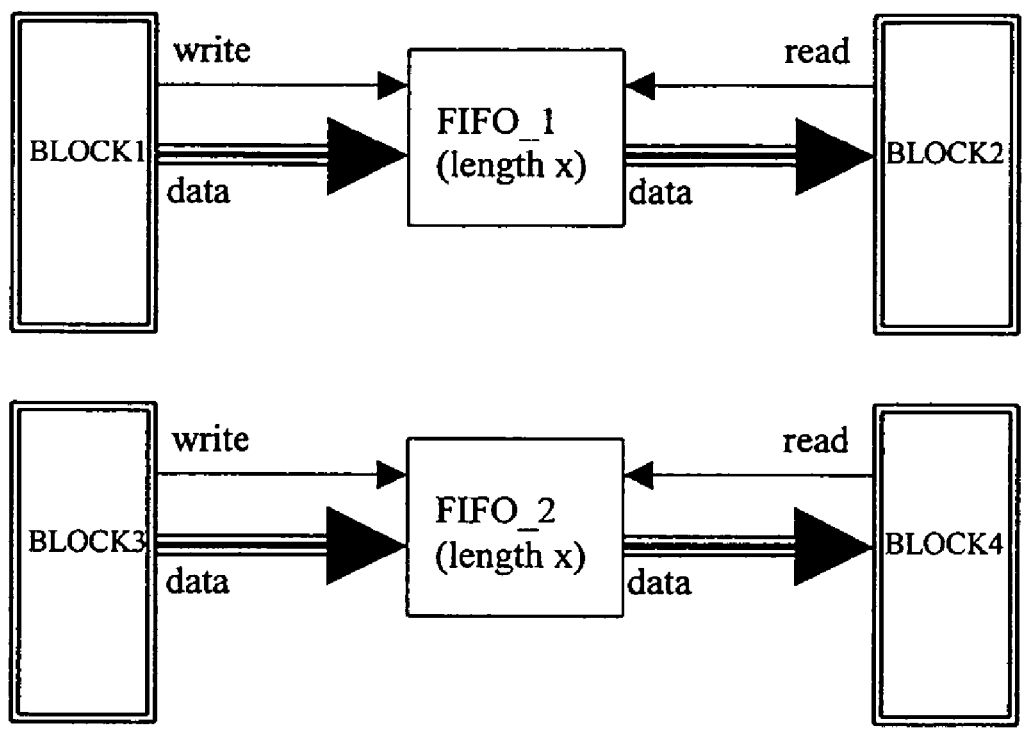
FIG. 1 is a block diagram of an architecture in which a separate FIFO memory is provided for each data source and their associated data receiver in accordance with the prior art.
Figure 2:
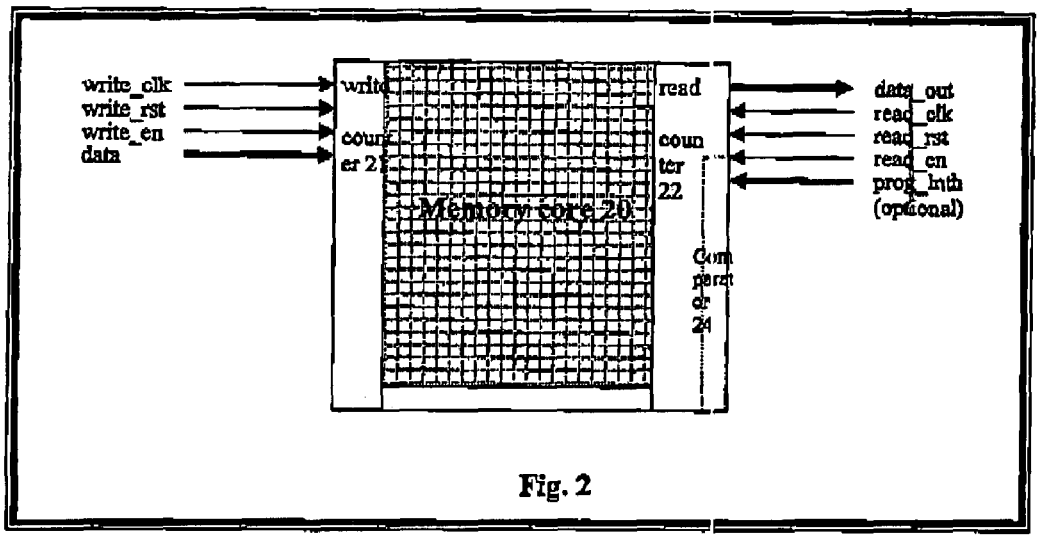
FIG. 2 is a block diagram illustrating a configurable length FIFO memory in accordance with the invention.

The present invention relates to configurable length first-in first-out (FIFO) memories. The architecture of the configurable length FIFO is illustrated in FIG. 2. The architecture comprises four blocks, namely a memory core 20, a write address counter 21, a read address counter 22 and additional circuitry for configuring the FIFO length and resetting the counter.

The memory core 20 is a general-purpose storage device which is a collection of memory storage cells that may be flip-flops or other storage devices. The outputs of the address counters 21 and 22 are connected to the memory core 20 and are used to point to a particular address in the memory. These counters 21 and 22 may count in an algebraic increment/decrement direction, gray code or any other way. Initially, the value of the read/write address counter 22, 21 is set to a starting value which points to the first address location in the memory core 20.

After each read/write operation, the counter is incremented/decremented until the last value on the counter is reached. The width of write and read address counters 21 and 22 is log2 (max number of locations of memory core).

After reaching the last value, the counter resets to the starting value. This means that after read/write operations on the last address location, the operation is performed on the first address location in the memory core 20. Hence, the memory core 20 in association with straightforward address counters form a FIFO memory.

The present invention provides a modified FIFO memory with additional circuitry associated with the read address counter 22 as will now be explained in reference to FIG. 3. The write address counter 21 is a straightforward address counter whose operation is not affected by the presence of additional circuitry. If the write enable pin is active, it counts address locations from an initial to a final address as write operations are performed.

Like any other counter, if the enable pin is deactivated, the output write_add_ptr is set to the current value in the counter until it is reset. The read address counter 22 counts in a similar way as the write address counter 21 when the read enable pin is active. The additional circuitry is used to synchronously reset the read address counter 22 to a starting value when the read address counter 22 value reaches the user defined FIFO length. The additional circuitry is also used to define the number of memory locations to read from in the memory core 20.

Figure 3:
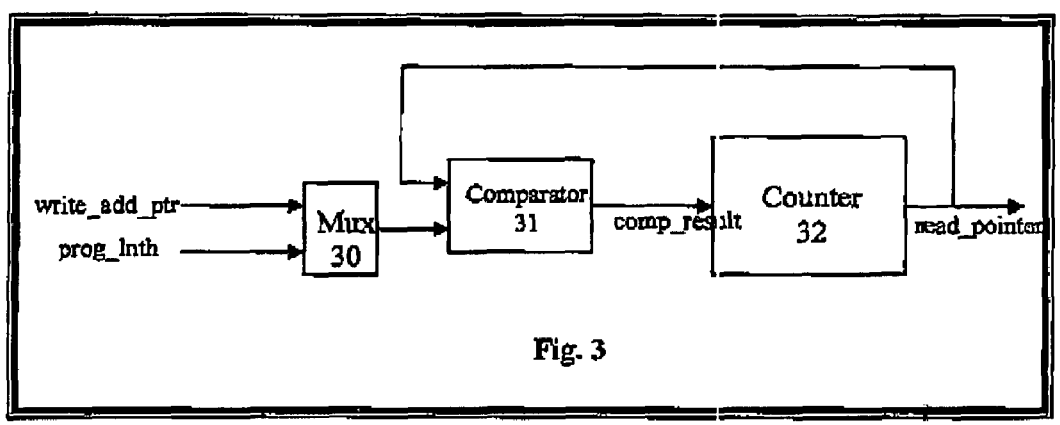
FIG. 3 is a block diagram of additional circuitry for resetting the read counter shown in FIG. 2.
Figure 4A:
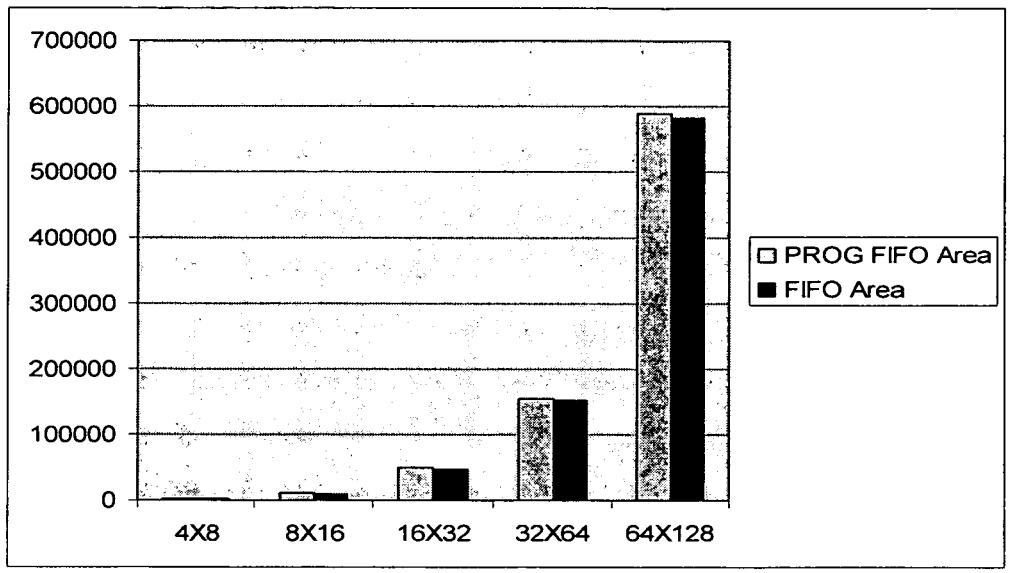
FIGS. 4a and 4b are graphs showing area comparisons for a FIFO memory in accordance with the present invention.
Figure 4B:
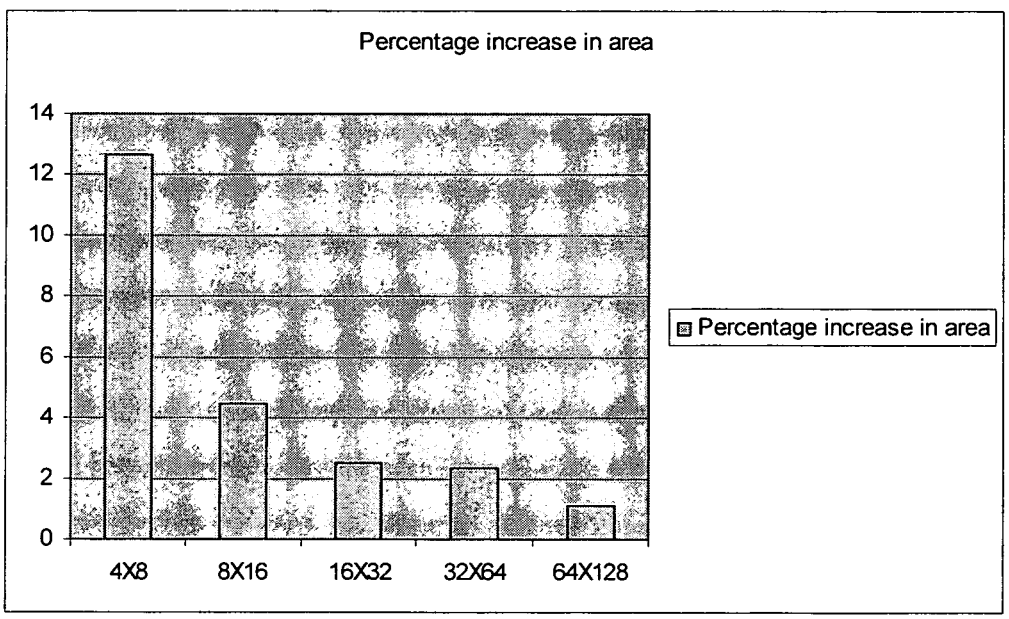
Figure 5A:
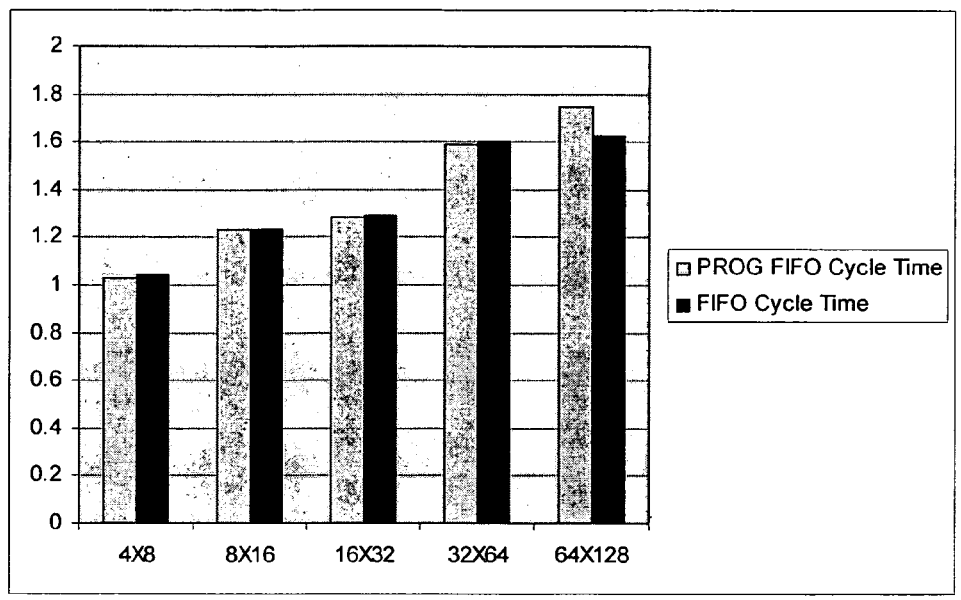
FIGS. 5a and 5b are graphs showing timing comparisons for a FIFO memory in accordance with the present invention.
Figure 5B:
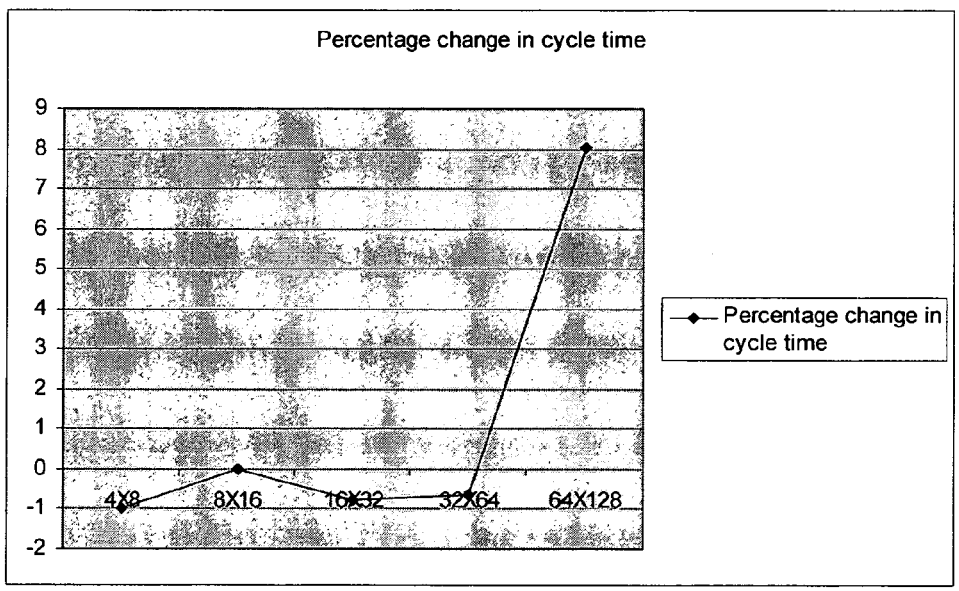

FIG. 3 illustrates the block diagram for a read address counter in association with additional circuitry. The modified circuitry comprises a multiplexer 30 and a comparator 31 in association with the read address counter 32. The multiplexer 30 receives two input signals write_add_ptr and prog_lnth and selects one signal based on a user provided external control signal. The output of the multiplexer 30 is connected to one of the input nodes of the comparator 31. The output of comparator 31 is used as a control signal for the read address counter 32. The output of the read address counter 32 is fed back as the other input for the comparator 31.

The modified circuitry is used to synchronously reset the read address counter to a starting value when the read address counter value reaches the user defined FIFO length. The additional circuitry is also used to define the number of memory locations to read in a memory core. Comparator 31 compares two inputs and produces a high on the output pin, comp_result, when the two inputs are bit-wise the same. This comp_result output is used as an input to the reset pin on the read address counter, and hence, when comp_result is high and the counter is reset.

There are two possible comparator inputs that may be used to generate the comp_result output. One of the inputs to the comparator 31 is the read address counter output that is updated after each read operation. The second input to the comparator 31 may be a user configured FIFO length Prog_lnth received through the input pins or the write address counter output write_addr_ptr. A multiplexer 30 is used to select between the two possible inputs to the comparator 31. This gives the user an option for selecting between the user-defined length or the pre-programmed write address counter value as the length for the FIFO memory.

Generally, SoCs have many programmable devices that need operations in terms of micro-codes, which are stored in FIFO memories. These codes are applied on different locations/blocks. After performing all the operations on a location, the FIFO memory is reset to the first location and operations are performed on the next location. Since the FIFO memory can be configured for different lengths, the same FIFO memory can be shared between different blocks requiring different size memories.

The proposed architecture is also very useful for storing codes for a programmable BIST. The BIST applies the patterns on all the memory locations without any clock delay. After the last operation on any location, the BIST needs to apply a first operation on the next location on the next clock edge. The programmable FIFO memory addresses this problem because it resets itself to the first location after reaching the last operation location irrespective of the last physical location of the FIFO memory. There is no need of resetting the FIFO memory on negative clock edges.

The proposed method is also useful in generating a fast delivery of FIFO IPs. The user only needs to generate a few FIFO options of different lengths. The programmable length pins are available as input pins. If a customer needs a FIFO memory with a different length, then the FIFO memory provider will choose from available FIFO options. An option of a length just higher than required is chosen and its length is configured by shorting the input pins, Prog_lnth, with the power pins, i.e., vdd and gnd pins. For example, if layouts options of length 2, 4, 8 and 12 are available and the customer requires a FIFO of length 10, the provider will select length 12 and configure the pins Prog_lnth[3:0] as 1010 by connecting Prog_lnth[3] and [1] pins to vdd and Prog_lnth[2] and [0] to gnd permanently. The method has a disadvantage in terms of area, but generates layouts in hours as compared to weeks.

Results will now be discussed. The area and timing comparisons are respectively shown in FIGS. 4a-4b and 5a-5b. It is observed that the percentage increase in area decreases as the FIFO memory size increases. Timing does not show much difference in both the cases except for the 64×128 cut where the cycle time increases by 8%.

The programmable FIFO can be used for storing micocodes of programmable devices, which needs to run operations on a number of locations/blocks. It can be used for storing the codes of a programmable BIST. There is no need of generating a reset on negative clocks. It can be shared between different blocks. A single programmable FIFO can replace multiple FIFO instances of different lengths, not used in parallel, since the length can be programmed. A programmable FIFO memory can be used as a normal FIFO memory. There is no need for resetting the read address counter since the programmable FIFO memory resets after reading all the valid data irrespective of the length of the FIFO memory. Further, the programmable FIFO memory can be used as a FIFO memory with any length less than the length of the FIFO memory and can be used for fast generation of a FIFO having a length less than the length of the available programmable FIFO memory.

The invention claimed is:

1. A configurable length first-in first-out (FIFO) memory comprising:
   a memory core for storing data;
   a write address counter coupled to said memory core for counting locations therein for writing the data to be stored and generating a corresponding write address counter length; and
   a read address counter device coupled to said memory core for counting the locations therein for reading the stored data, said read address counter device comprising
      a read address counter,
      a comparator for generating a synchronous reset for said read address counter, and
      a selector having a first input for receiving a user defined FIFO length and a second input for receiving the write address counter length, said selector providing a selected length of the FIFO memory to said comparator.

2. A configurable length FIFO memory according to claim 1 wherein said memory core comprises a plurality of memory cells.

3. A configurable length FIFO memory according to claim 1 wherein said memory core comprises a plurality of flip-flops.

4. A configurable length FIFO memory according to claim 1 wherein said comparator generates an active high signal when said read address counter equals the user defined FIFO length or the write address counter length.

5. A configurable length FIFO memory according to claim 1 wherein said read address counter synchronously resets to an initial address location on generation of an active high signal by said comparator.

6. A configurable length FIFO memory according to claim 1 wherein said selector comprises a multiplexer.

7. A system on a chip (SoC) comprising:
   a substrate;
   a plurality of data source circuits on said substrate;
   a plurality of data receiver circuits on said substrate; and
   a first-in first-out (FIFO) memory coupled to said plurality of data source circuits and data receiver circuits, said FIFO memory comprising
      a memory core for storing data,
      a write address counter coupled to said memory core for counting locations therein for writing the data to be stored and generating a corresponding write address counter length, and
      a read address counter device coupled to said memory core for counting the locations therein for reading the stored data, said read address counter device comprising
         a read address counter,
         a comparator for generating a synchronous reset for said read address counter, and
         a selector having a first input for receiving a user defined FIFO length and a second input for receiving the write address counter length, said selector providing a selected length of the FIFO memory to said comparator.

8. An SoC according to claim 7 wherein said memory core comprises a plurality of memory cells.

9. An SoC according to claim 7 wherein said memory core comprises a plurality of flip-flops.

10. An SoC according to claim 7 wherein said comparator generates an active high signal when said read address counter equals the user defined FIFO length or the write address counter length.

11. An SoC according to claim 7 wherein said read address counter synchronously resets to an initial address location on generation of an active high signal by said comparator.

12. An SoC according to claim 7 wherein said selector comprises a multiplexer.

13. A method for configuring the length of a first-in first-out (FIFO) memory comprising a memory core, a write address counter coupled to the memory core and a read address counter device coupled to the memory core, the method comprising:
   counting locations in the memory core using the write address counter for writing data to be stored therein and for generating a corresponding write address counter length;

counting the locations in the memory core using the read address counter device for reading the stored data;
selecting between a user defined FIFO length or the write address counter length;
comparing a read address counter value to the user defined FIFO length or the write address counter length;
generating a synchronous reset signal on reaching the user defined FIFO length or the write address counter length; and
resetting the read address counter device to an initial address on receiving the synchronous reset signal.

14. A method according to claim 13 wherein the read address counter device comprises a read address counter, a comparator for generating the synchronous reset for the read address counter, and a selector coupled to the comparator for selecting the user defined FIFO length or the write address counter length.

15. A method according to claim 13 wherein the memory core comprises a plurality of memory cells.

16. A method according to claim 13 wherein said memory core comprises a plurality of flip-flops.

17. A method according to claim 14 wherein the comparator generates an active high signal when the read address counter equals the user defined FIFO length or the write address counter length.

18. A method according to claim 14 wherein the read address counter synchronously resets to an initial address location on generation of an active high signal by the comparator.

19. A method according to claim 14 wherein the selector comprises a multiplexer.

* * * * *